US011388761B2

(12) United States Patent
Tavildar et al.

(10) Patent No.: US 11,388,761 B2
(45) Date of Patent: *Jul. 12, 2022

(54) PROVIDING A SYSTEM INFORMATION BLOCK REQUEST AND RESPONSE

(71) Applicant: QUALCOMM Incorporated, San Diego, CA (US)

(72) Inventors: Saurabha Tavildar, Jersey City, NJ (US); Tingfang Ji, San Diego, CA (US); Gavin Bernard Horn, La Jolla, CA (US); Ravi Agarwal, San Diego, CA (US); Keiichi Kubota, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/572,487

(22) Filed: Sep. 16, 2019

(65) Prior Publication Data
US 2020/0015292 A1 Jan. 9, 2020

Related U.S. Application Data

(63) Continuation of application No. 15/242,124, filed on Aug. 19, 2016, now Pat. No. 10,420,154.
(Continued)

(51) Int. Cl.
H04W 4/00 (2018.01)
H04W 76/11 (2018.01)
(Continued)

(52) U.S. Cl.
CPC ............ *H04W 76/11* (2018.02); *H04W 24/08* (2013.01); *H04W 48/12* (2013.01); *H04W 48/14* (2013.01);
(Continued)

(58) Field of Classification Search
CPC ..... H04W 76/11; H04W 24/08; H04W 48/12; H04W 48/14; H04W 52/02;
(Continued)

(56) References Cited

U.S. PATENT DOCUMENTS 4,442,755 A 4/1984 Rozycki
8,774,131 B1 * 7/2014 Singh ................ H04W 36/0061
370/331
(Continued)

FOREIGN PATENT DOCUMENTS

CN 102859904 A 1/2013
CN 103546920 A 1/2014
(Continued)

OTHER PUBLICATIONS

Taiwan Search Report—TW106103182—TIPO—dated Feb. 27, 2020.
(Continued)

*Primary Examiner* — Stephen M D Agosta
(74) *Attorney, Agent, or Firm* — Loza & Loza LLP

(57) ABSTRACT

Aspects of the present disclosure provide various techniques for requesting a system information block (SIB) and providing a SIB response for a user equipment (UE) in a UE-centric wireless communication network. In some aspects of the disclosure, the network may transmit the SIB to the UEs in a broadcast mode or in an on-demand mode.

16 Claims, 12 Drawing Sheets

UE Centric Call Flow w/ Broadcast SIB Response

Related U.S. Application Data

(60) Provisional application No. 62/293,633, filed on Feb. 10, 2016.

(51) Int. Cl.
*H04W 24/08* (2009.01)
*H04W 72/04* (2009.01)
*H04W 48/12* (2009.01)
*H04W 48/14* (2009.01)
*H04W 52/02* (2009.01)
*H04W 48/20* (2009.01)

(52) U.S. Cl.
CPC ....... *H04W 52/02* (2013.01); *H04W 52/0206* (2013.01); *H04W 72/0406* (2013.01); *H04W 48/20* (2013.01); *Y02D 30/70* (2020.08)

(58) Field of Classification Search
CPC ......... H04W 52/0206; H04W 72/0406; H04W 48/20; Y02D 30/70; Y02D 70/1242; Y02D 70/1262; Y02D 70/1264; H04L 5/0048; H04L 5/005; H04L 5/0051; H04L 7/0008; H04L 1/00; H04J 11/0069; H04J 11/0073; H04J 11/0079; H04J 11/0093; H04B 7/0695; H04B 7/088; H04B 7/0408; H04B 7/0617; H04B 17/309; H04B 1/005; H04B 1/0057
See application file for complete search history.

(56) References Cited

U.S. PATENT DOCUMENTS

| | | | |
|---|---|---|---|
| 9,674,695 B2* | 6/2017 | Ren | H04W 56/0005 |
| 9,717,110 B1* | 7/2017 | Gupta | H04W 72/042 |
| 2002/0041578 A1 | 4/2002 | Kim et al. | |
| 2005/0226140 A1 | 10/2005 | Zhuang et al. | |
| 2008/0123616 A1* | 5/2008 | Lee | H04L 5/0053 |
| | | | 370/344 |
| 2009/0088164 A1 | 4/2009 | Shen et al. | |
| 2010/0002804 A1* | 1/2010 | Ogawa | H04L 25/0226 |
| | | | 375/300 |
| 2010/0099413 A1 | 4/2010 | Kubo et al. | |
| 2010/0210268 A1* | 8/2010 | Lim | H04W 36/08 |
| | | | 455/436 |
| 2010/0322115 A1* | 12/2010 | Wei | H04L 5/0044 |
| | | | 370/280 |
| 2011/0014916 A1* | 1/2011 | Cho | H04W 36/0061 |
| | | | 455/437 |
| 2011/0117929 A1* | 5/2011 | Yamagishi | H04W 60/04 |
| | | | 455/456.1 |
| 2011/0263259 A1 | 10/2011 | Yamagishi et al. | |
| 2012/0044876 A1* | 2/2012 | Taaghol | H04W 84/042 |
| | | | 370/329 |
| 2012/0163305 A1* | 6/2012 | Nimbalker | H04W 52/0206 |
| | | | 370/329 |
| 2012/0165058 A1* | 6/2012 | Hwang | H04W 74/006 |
| | | | 455/509 |
| 2012/0231820 A1 | 9/2012 | Chun et al. | |
| 2012/0282964 A1* | 11/2012 | Xiao | H04W 52/146 |
| | | | 455/515 |
| 2013/0012216 A1 | 1/2013 | Chen et al. | |
| 2013/0017841 A1 | 1/2013 | Kazmi et al. | |
| 2013/0039350 A1 | 2/2013 | Bhatia et al. | |
| 2013/0039359 A1 | 2/2013 | Bedrosian | |
| 2013/0215835 A1 | 8/2013 | Chen et al. | |
| 2014/0029420 A1 | 1/2014 | Jeong et al. | |
| 2014/0315549 A1* | 10/2014 | Zhang | H04W 48/10 |
| | | | 455/434 |
| 2015/0079881 A1* | 3/2015 | Maruyama | B24B 55/02 |
| | | | 451/53 |
| 2015/0079981 A1* | 3/2015 | Zhu | H04W 8/06 |
| | | | 455/434 |
| 2015/0139422 A1 | 5/2015 | Jover et al. | |
| 2015/0181492 A1* | 6/2015 | Schmidt | H04W 36/30 |
| | | | 455/443 |
| 2015/0201368 A1* | 7/2015 | Cudak | H04W 72/0413 |
| | | | 370/329 |
| 2015/0230204 A1* | 8/2015 | Lin | H04W 74/002 |
| | | | 370/312 |
| 2015/0264638 A1* | 9/2015 | Han | H04W 48/16 |
| | | | 370/329 |
| 2015/0382281 A1 | 12/2015 | Sirotkin | |
| 2015/0382284 A1 | 12/2015 | Brismar et al. | |
| 2017/0231021 A1 | 8/2017 | Tavildar et al. | |
| 2018/0013477 A1* | 1/2018 | Kim | H04B 7/06 |

FOREIGN PATENT DOCUMENTS

| | | |
|---|---|---|
| CN | 104519576 A | 4/2015 |
| EP | 2830351 A1 | 1/2015 |
| WO | 2013068362 A1 | 5/2013 |
| WO | 2015028081 A1 | 3/2015 |
| WO | 2016195617 A1 | 12/2016 |

OTHER PUBLICATIONS

International Search Report and Written Opinion—PCT/US2017/015441—ISA/EPO—dated Apr. 10, 2017.

Mohamed A., et al., "LTE Air Interface and Procedures" In: "Design, Deployment and Performance of 4G-LTE Networks", Apr. 15, 2014 (Apr. 15, 2014), John Wiley & Sons, Ltd, Chichester, UK, XP055360345, 55 pages.

Qualcomm Technologies: "Making 5G NR a Reality", Dec. 2016, XP055360375, Retrieved from the Internet: URL: https://www.qualcomm.com/documents/whitepaper-making-5g-nr-reality [Retrieved on Mar. 30, 2017-].

Samsung: "System Information Signalling Design in NR", 3GPP Draft; R2-163371 System Information Signaling Design in NR, 3rd Generation Partnership Project (3GPP), Mobile Competence Centre, 650, Route Des Lucioles; F-06921 Sophia-Antipolis Cedex, France, vol. RAN WG2, Nanjing, China; May 23, 2016-May 27, 2016, May 22, 2016 (May 22, 2016). XP051104902, Retrieved from the Internet: URL: http://www.3gpp.org/ftp/Meetings_3GPP_SYNC/RAN2/Docs/ [retrieved on May 22, 2016].

Smee J., "Qualcomm 5g Vision and Design", 5G Vision and Design IEEE 5G Summit Silicon Valley, Nov. 16, 2015 (Nov. 16, 2015), XP055360363, 22 pages.

Taiwan Search Report—TW109116466—TIPO—dated Sep. 9, 2021.

* cited by examiner

PROVIDING A SYSTEM INFORMATION BLOCK REQUEST AND RESPONSE

PRIORITY CLAIM

This application is a continuation of U.S. patent application Ser. No. 15/242,124, filed in the United States Patent and Trademark Office on Aug. 19, 2016, which claims priority to and the benefit of U.S. Provisional Patent Application No. 62/293,633 filed in the United States Patent and Trademark Office on Feb. 10, 2016, the entire contents of both of which are incorporated herein by reference as if fully set forth below in their entirety and for all applicable purposes.

TECHNICAL FIELD

The technology discussed below relates generally to wireless communication systems, and more particularly, to techniques for requesting a system information block (SIB) and providing a SIB response.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, commonly known as user equipment (UE). In a Long-Term Evolution (LTE) or LTE-Advanced (LTE-A) network, a set of one or more base stations may define an eNodeB (eNB). In other examples (e.g., in a next generation or 5G network), a wireless multiple access communication system may include a number of smart radio heads (SRHs) in communication with a number of access node controllers (ANCs), where a set of one or more SRHs, in communication with an ANC, defines an eNB. A base station or SRH may communicate with a set of UEs on downlink channels (e.g., for transmissions from a base station/SRH to a UE) and uplink channels (e.g., for transmissions from a UE to a base station/SRH).

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide various techniques for requesting a system information block (SIB) and providing a SIB response for a user equipment (UE) in a UE-centric wireless communication network. In some aspects of the disclosure, the network may transmit the SIB to the UEs in a broadcast mode or in an on-demand mode.

One aspect of the disclosure provides a method of wireless communication operable at a user equipment (UE). The method includes receiving a master information block (MIB) from an access network, where the MIB includes configuration information for the access network, and establishing a connection with the access network utilizing information in the MIB. The method further includes transmitting a chirp signal to the access network as part of a random access procedure, where the chirp signal includes a reference signal, and the chirp signal is configured as a system information request to facilitate the access network in determining one or more system information blocks that include other system information utilized by the UE. The method further includes receiving a system information response comprising the one or more system information blocks broadcasted in response to the chirp signal.

Another aspect of the disclosure provides a method of wireless communication operable at an access network that includes a plurality of base stations. The method includes transmitting a master information block (MIB) including configuration information for the access network. The method further includes receiving a chirp signal from a user equipment (UE) as part of a random access procedure, where the chirp signal includes a reference signal. The method further includes determining one or more system information blocks that include other system information, based on the chirp signal. The method further includes broadcasting a system information response that includes the one or more system information blocks to the UE in response to the chirp signal.

Another aspect of the disclosure provides a user equipment (UE) that includes a communication interface configured to communicate with an access network, a memory that stores executable code, and one or more processors operatively coupled to the communication interface and the memory. Here, the one or more processors are configured by the executable code to receive a master information block (MIB) from an access network, where the MIB includes configuration information for the access network. The one or more processors are further configured by the executable code to establish a connection with the access network utilizing information in the MIB. The one or more processors are further configured by the executable code to transmit a chirp signal to the access network as part of a random access procedure, where the chirp signal includes a reference signal, where the chirp signal is configured as a system information request to facilitate the access network in determining one or more system information blocks that include other system information utilized by the UE. The one or more processors are further configured by the executable code to receive a system information response that includes the one or more system information blocks broadcasted in response to the chirp signal.

Another aspect of the disclosure provides an access network node including a communication interface configured to communicate with a user equipment (UE), a memory that stores executable code, and one or more processors operatively coupled to the communication interface and the memory. Here, the one or more processors are configured by the executable code to transmit a master information block (MIB) that includes configuration information for the access network. The one or more processors are further configured by the executable code to receive a chirp signal from a user equipment (UE) as part of a random access procedure, where the chirp signal includes a reference signal. The one or more processors are further configured by the executable code to determine one or more system information blocks, which include other system information, based on the chirp signal. The one or more processors are further configured by the executable code to broadcast a system information response that includes the one or more system information blocks to the UE in response to the chirp signal.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Aspects of the present disclosure provide various techniques for requesting a system information block (SIB) and providing a SIB response for a user equipment (UE) in a UE-centric wireless communication network. These techniques may be implemented with an access network supporting UE-centric MAC (media access control) or an access network not supporting UE-centric MAC. In some aspects of the disclosure, a UE-centric wireless network may forgo the regular broadcast of system information (e.g., SIB) because the regular broadcast of system information by a base station can contribute significantly to the power consumption of the base station. In some aspects of the disclosure, the network (e.g., a base station) may transmit the SIB to the UEs in a broadcast mode (e.g., where a base station transmits the SIB regardless of whether the SIB is requested or needed by any UEs within a certain coverage area) or in an on-demand mode. In the on-demand mode, the network transmits the SIB in response to receiving a request from one or more UEs. When transmitting the SIB in an on-demand mode, the network may forgo the broadcast of the SIB, which may conserve power.

Figure 1:
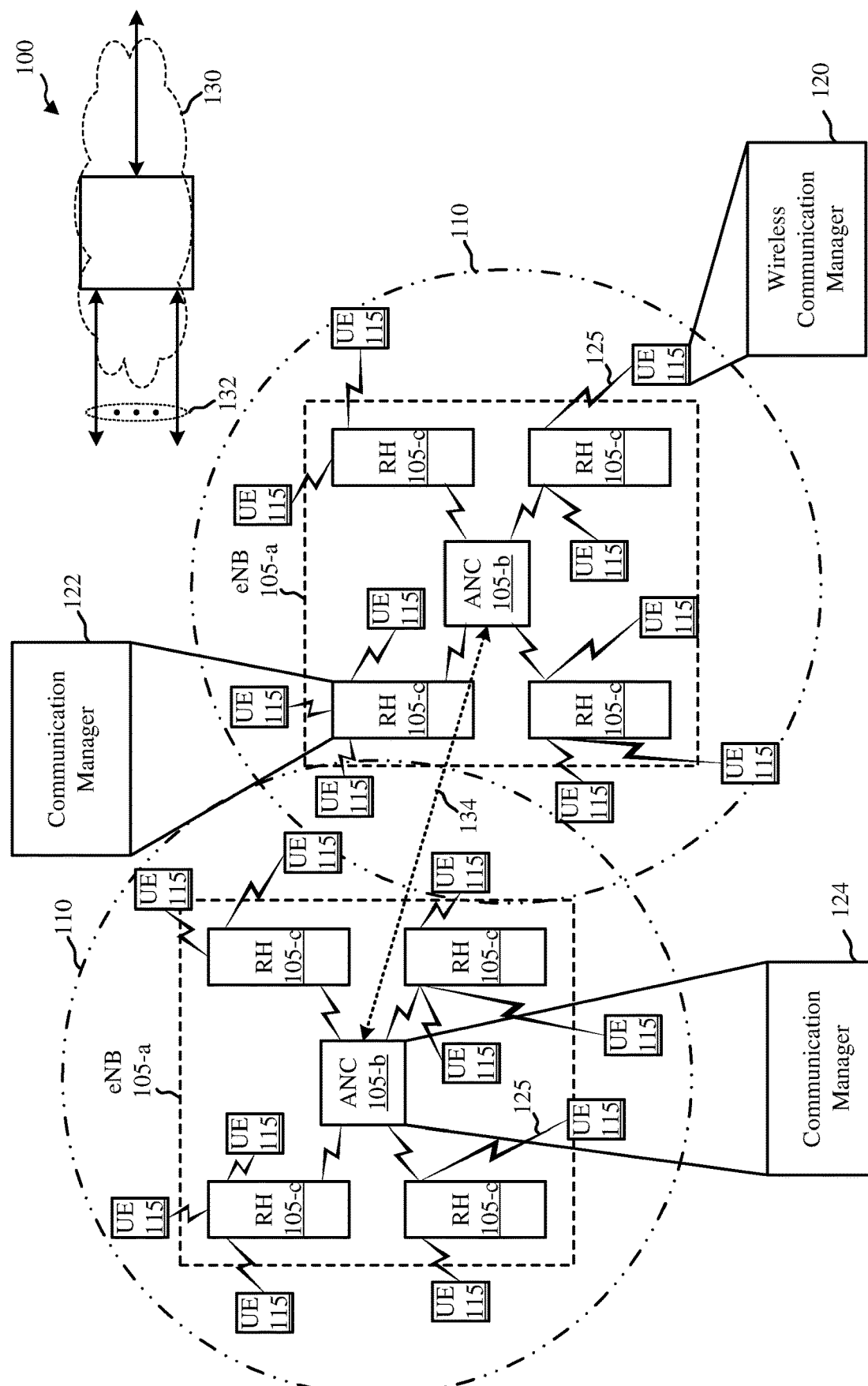
FIG. 1 illustrates an example of a wireless communication system in accordance with various aspects of the disclosure.

FIG. 1 illustrates an example of a wireless communication system 100, in accordance with various aspects of the disclosure. The wireless communication system 100 may include network access devices 105, UEs 115, and a core network 130. The core network 130 may provide user authentication, access authorization, tracking, Internet Protocol (IP) connectivity, and other access, routing, or mobility functions. At least some of the network access devices 105 (e.g., eNBs 105-*a* or ANCs 105-*b*) may interface with the core network 130 through backhaul links 132 (e.g., S1, S2, etc.) and may perform radio configuration and scheduling for communication with the UEs 115. In various examples, the ANCs (access node controllers) 105-*b* may communicate, either directly or indirectly (e.g., through core network 130), with each other over backhaul links 134 (e.g., X1, X2, etc.), which may be wired or wireless communication links.

Each ANC 105-*b* may also communicate with a number of UEs 115 through a number of smart radio heads (SRHs or RHs) 105-*c*. A RH may include, for example, radio frequency (RF) components (e.g., one or more transceivers) and a modem. In an alternative configuration of the wireless communication system 100, the functionality of an ANC 105-*b* may be provided by a RH 105-*c* or distributed across the radio heads 105-*c* of an eNB 105-*a*. In another alternative configuration of the wireless communication system 100, the RHs 105-*c* may be replaced with base stations, and the ANCs 105-*b* may be replaced by base station controllers (or links to the core network 130).

The ANCs 105-*b* may wirelessly communicate with the UEs 115 via one or more RHs 105-*c*, with each RH 105-*c* having one or more antennas. Each of the RHs 105-*c* may provide communication coverage for a respective geographic coverage area 110, and may provide one or more remote transceivers associated with an ANC 105-*b*. In some aspects of the disclosure, a RH 105-*c* may perform many of the functions of a LTE/LTE-A base station or eNB, or similar functions. In some examples, an ANC 105-*b* may be implemented in distributed form, with a portion of the ANC 105-*b* being provided in each RH 105-*c*. The geographic coverage area 110 for a RH 105-*c* may be divided into sectors making up only a portion of the coverage area (not shown). In some examples, the network access devices 105 may be replaced with alternative network access devices, such as base transceiver stations, radio base stations, access points, radio transceivers, NodeBs, eNodeBs (eNBs), Home NodeBs, Home eNodeBs, etc. The wireless communication system 100 may include RHs 105-*c* (or base stations or other network access devices) of different types (e.g., macro cell and/or small cell network access devices). The geographic coverage areas 110 of the RHs 105-*c* or other network access devices may overlap. In some examples, different eNBs 105-*a* may be associated with different radio access technologies.

In some examples, the wireless communication system 100 may include a 5G network. In other examples, the wireless communication system 100 may include a LTE/LTE-A network. The wireless communication system 100 may in some cases be a heterogeneous network, in which different types of eNBs, RHs 105-*c*, and/or ANC 105-*b* provide coverage for various geographical regions. For example, each eNB 105-*a* or RH 105-*c* may provide communication coverage for a macro cell, a small cell, and/or other types of cell. The term "cell" is a Third Generation Partnership Project (3GPP) term that can be used to describe a base station, a radio head, a carrier or component carrier associated with a base station or a radio head, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) and/or radio access technology (RAT) as macro cells Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home or business premises) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-*a* and/or RHs 105-*c* may have similar frame timing, and transmissions from different eNBs 105-*a* and/or RHs 105-*c* may be approximately aligned in time. For asynchronous operation, the eNBs 105-*a* and/or RHs 105-*c* may have different frame timings, and transmissions from different eNBs 105-*a* and/or RHs 105-*c* may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a RH 105-*c*, ANC 105-*b*, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a smartphone, a tablet computer, a laptop computer, a cordless phone, a wireless local loop (WLL) station, a wireless wearable device, an Internet of Everything (IoE) device, a set-top box, a home appliance, or other electronic device having a wireless communication interface. A UE may be able to communicate with various types of eNBs 105-*a*, RHs 105-*c*, base stations, access points, or other network access devices, including macro eNBs, small cell eNBs, relay base stations, and the like. A UE may also be able to communicate directly with other UEs as peers (e.g., using a peer-to-peer (P2P) protocol).

The communication links 125 shown in the wireless communication system 100 may include uplink (UL) channels from a UE 115 to a RH 105-*c*, and/or downlink (DL) channels, from a RH 105-*c* to a UE 115. The downlink channels may also be called forward link channels, while the uplink channels may also be called reverse link channels.

One or more of the UEs 115 may include a wireless communication manager 120. In some examples, the wireless communication manager 120 may be used to perform the functions and procedures illustrated in FIGS. 2-4 and 9-12. One or more of the network access devices 105 (e.g., one or more RHs 105-c) may include a communication manager 122. One or more of the network access devices 105 (e.g., one or more ANCs 105-b) may include a communication manager 124. In some examples, the communication managers 122 and 124 may be used to perform the functions and procedures illustrated in FIGS. 2-4 and 9-12.

Each communication link 125 may include one or more carriers, where each carrier may be a signal made up of multiple sub-carriers or tones (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using FDD techniques (e.g., using paired spectrum resources) or Time Division Duplexing techniques (e.g., using unpaired spectrum resources). Different frame structures for FDD (e.g., frame structure type 1) and TDD (e.g., frame structure type 2) may be defined.

In some examples of the wireless communication system 100, the RHs 105-c and/or UEs 115 may include multiple antennas for employing antenna diversity schemes to improve communication quality and reliability between RHs 105-c and UEs 115. Additionally or alternatively, the RHs 105-c and/or UEs 115 may employ multiple-input and multiple-output (MIMO) techniques that may take advantage of multi-path environments to transmit multiple spatial layers or data streams carrying the same or different coded data.

The wireless communication system 100 may support operation on multiple cells or carriers, a feature which may be referred to as carrier aggregation (CA) or multi-carrier operation that may increase bandwidth and/or redundancy. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Some next-generation or 5G networks may support a UE-centric mobility model. In this model, a UE in a UE-centric access network may not measure its neighbor cells of the current serving cell. Instead, the network (e.g., a RH or eNB) measures a chirp signal (access signal) periodically transmitted from the UE and makes a mobility decision based on the measurements of UE's uplink chirp signal including the reference signal. In some examples, the chirp signal may include one or more of a pilot signal, a reference signal (e.g., a random access procedure reference signal), a UE identifier (ID), and/or a buffer status report (BSR). BSR may carry the information on how much data is in a UE buffer to be sent out. Based on the measurements of the chirp signal by the access network, the UE-centric network may identify a serving cell (e.g., base station, eNB, or RH) for the UE. As the UE moves within the UE-centric network, the network may make at least some mobility decisions for the UE transparently to the UE. By operating mobility in this way, the UE may save battery power by omitting neighbor cell measurement, and the network can save energy by omitting continuous reference signal transmission.

Figure 2:
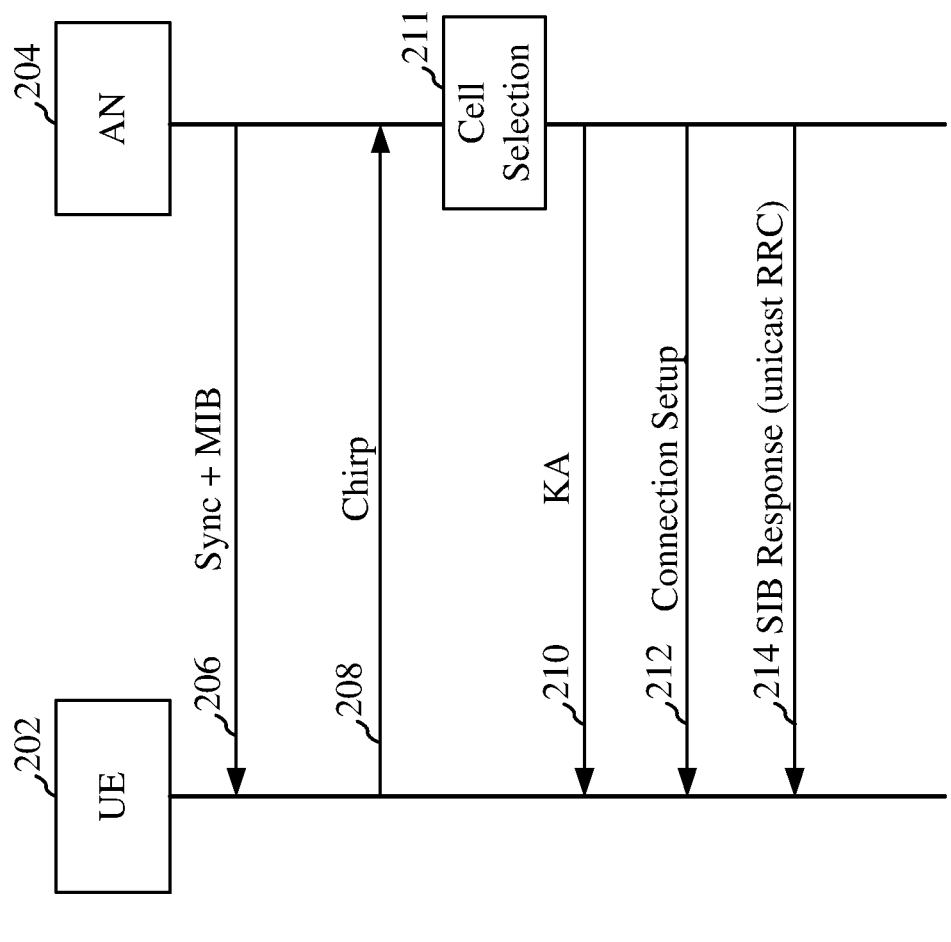
FIG. 2 illustrates a UE-centric call flow diagram between a user equipment (UE) and an access network (AN) in accordance with one aspect of the disclosure.

FIG. 2 illustrates a UE-centric call flow diagram between a UE 202 and an access network (AN) 204 in accordance with one aspect of the disclosure. Initially, the access network 204 transmits synchronization information (Sync) and basic network configuration information 206 to the UE 202. The access network 204 and UE 202 may be the access network and UE illustrated in FIG. 1. The synchronization information provides timing information and allows the UE to achieve coarse frequency synchronization with the access network. In an LTE example, two synchronization signals are transmitted to the UE. They may be the primary synchronization signal (PSS) and secondary synchronization signal (SSS). The basic network configuration information may be included in a master information block (MIB). The MIB may carry some physical layer information of the cell that allows the UE to perform an initial access of the network using for example one or more of an identification of the network, or an identification of a base station in the network. With the basic network information (e.g., synchronization and MIB), the UE 202 can receive additional network information contained in a system information block (SIB) from the access network 204.

The UE 202 may transmit a chirp signal 208 to the access network 204. For example, the chirp signal 208 may include a reference signal, a UE ID, and a BSR. The chirp signal may be transmitted by the UE periodically or at any predetermined time intervals. In response to the chirp signal 208, the access network 204 transmits a keep-alive (KA) signal 210 to the UE. For example, the KA signal may be a page signal (e.g., 1-bit page) transmitted by a RH or base station currently acting as the serving cell of the UE. The KA signal may be used to check that the connection between the UE 202 and the access network 204 is operating correctly and/or to keep the connection from disconnecting. The chirp signal may be received and monitored by a set of base stations or RHs of the access network 204. For example, the RHs may be similar to those illustrated in FIG. 1. Each of the RHs may report its measurement result of the chirp signal 208 back to an ANC (e.g., ANC 105-b in FIG. 1). Based on the measurement results (e.g., signal-to-noise ratio (SNR), signal-to-interference plus noise ratio (SINR), signal strength, etc.), the ANC and/or RH can select (block 211) or change the serving cell or RH.

The access network 204 (e.g., a serving eNB or cell) also transmits connection setup information 212 to the UE 202. For example, the connection setup information may include a cell identifier (ID), a timing advance, a C-RNTI (Cell Radio Network Temporary Identifier), uplink (UL)/downlink (DL) assignment, etc. The cell ID may be different from the identifier or ID of the current serving cell due to the mobility of the UE. For example, the cell ID may identify a different serving RH or cell. If the connection setup information 212 indicates a different serving cell or RH, the UE may perform a handover (HO) procedure to switch to the new serving cell or RH.

The access network 204 also transmits an SIB response 214 to the UE 202. The SIB response 214 includes one or more SIBs. The SIBs carry relevant system information for the UE, which helps the UE 202 to access a cell/RH and/or perform cell re-selection if needed. The SIBs also may carry information related to Intra-frequency, Inter-frequency, and Inter-RAT cell selections. In general, the SIBs provide the information utilized by the UE to attach to the access network 204. In some aspects of the disclosure, the SIB may indicate which radio access technologies (RATs) are available in a region and how the UE is to select an available RAT. The SIB may indicate which services are available in a region and how the UE is to obtain an available service.

In one example, the SIB response 214 may be transmitted as a unicast RRC message after the UE 202 has established an RRC dedicated state with the network. A unicast message is a message that is sent to a single network destination (e.g., a UE) identified by a unique address (e.g., UE-ID, C-RNTI). In an RRC dedicated state, certain network resources (e.g., transport channels, physical channels) are dedicated or allocated to the UE for UL and/or DL communication. In this example, the UE 202 does not specifically identify or transmit an SIB request to the access network because the access network 204 makes the decision on mobility and selects the serving cell based on the chirp signal 208. That is, the access network 204 may transmit the SIB response 214 as a unicast RRC message to the UE 202 without receiving a specific request from the UE.

Figure 3:
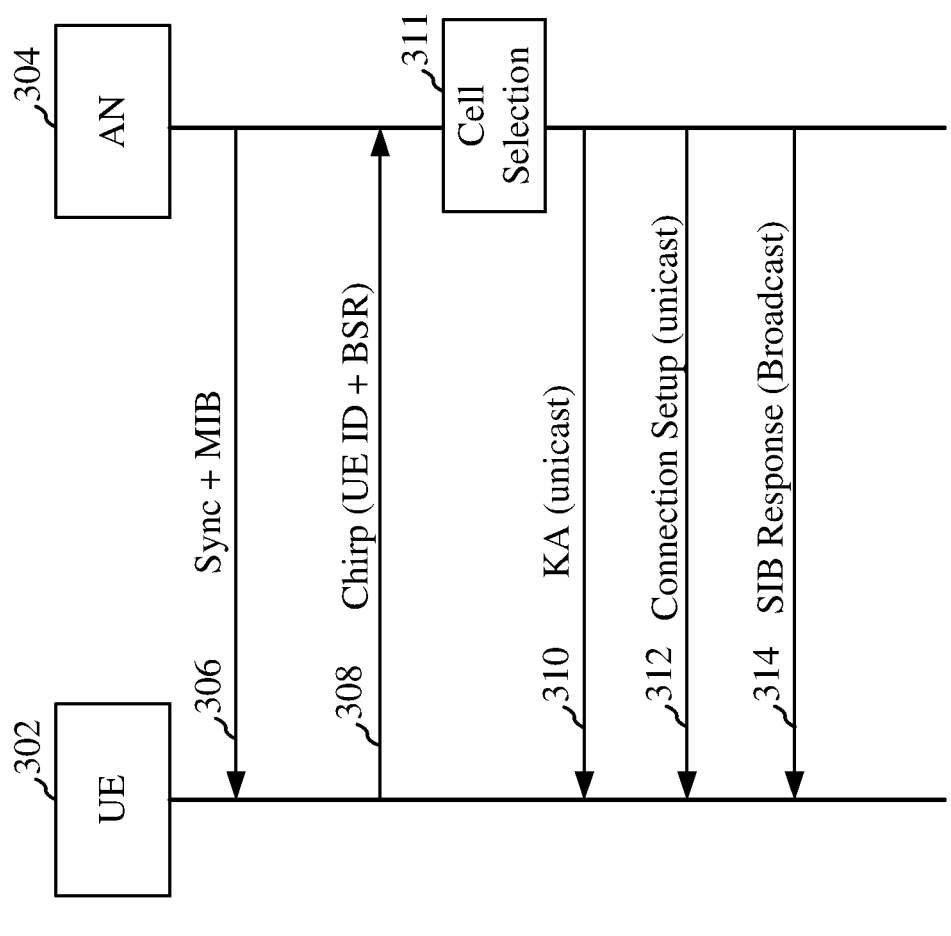
FIG. 3 illustrates a UE-centric call flow diagram between a UE and an access network in accordance with one aspect of the disclosure.

FIG. 3 illustrates a UE-centric call flow diagram between a UE 302 and an access network 304 in accordance with one aspect of the disclosure. The access network 304 and UE 302 may be the same as the access network and UE illustrated in FIG. 1. The flow diagrams of FIGS. 2 and 3 are similar, and redundant information may be omitted for brevity. Initially, the access network 304 transmits synchronization information and basic network configuration information 306 to the UE 302. The synchronization information provides timing information that allows the UE 302 to achieve coarse frequency synchronization with the access network. The basic network configuration information may be included in an MIB. With the basic network information (e.g., synchronization and MIB), the UE 302 can receive additional network information contained in one or more SIBs from the access network 304.

The UE 302 may transmit a chirp signal 308 to the access network 304. For example, the chirp signal 308 may include a reference signal, a UE ID, and a BSR. The chirp signal may be transmitted by the UE 302 periodically or at any predetermined time intervals. The chirp signal 308 may be received and monitored by a set of base stations or RHs of the access network 304. For example, the RHs may be similar to those illustrated in FIG. 1. Each of the RHs may report its measurement result of the chirp signal back to an ANC (e.g., ANC 105-*b* in FIG. 1). Based on the measurement results, the ANC can select 311 or change the serving cell, eNB, or RH. In response to the chirp signal 308, the access network 304 transmits a keep-alive (KA) signal 310 to the UE as a unicast message.

The access network 304 (e.g., a serving eNB or cell) also transmits connection setup information 312 to the UE 302 as a unicast message. For example, the connection setup information may include a cell ID, timing advance, C-RNTI, UL/DL assignment, etc. The cell ID may be different from the ID of the current serving cell, eNB, or RH due to the mobility of the UE. For example, the cell ID may identify a different serving RH. If the connection setup information 312 indicates a different serving cell, eNB, or RH, the UE may perform a handover (HO) procedure to switch to the new serving cell, eNB, or RH.

The access network 304 also transmits an SIB response 314 to the UE 302. The SIB response 314 may include one or more SIBs. In this example, the SIB response 314 may be transmitted as a broadcast RRC message. For example, the SIB response 314 may be scrambled with the serving cell ID and transmitted to a predetermined broadcast address. In this case, the broadcast address may be a fixed UE ID or C-RNTI that may allow one or more UEs to receive the broadcasted SIB response 314. In this example, the UE-centric UE 302 does not specifically identify or transmit an SIB request to the access network 304 because the access network selects the serving cell for the UE based on the chirp signal 308. That is, the access network 304 may transmit the SIB response 314 to the UE without receiving an SIB request. In the above described UE-centric call flows illustrated in FIGS. 2 and 3, the access network makes the cell selection for the UE.

Figure 4:
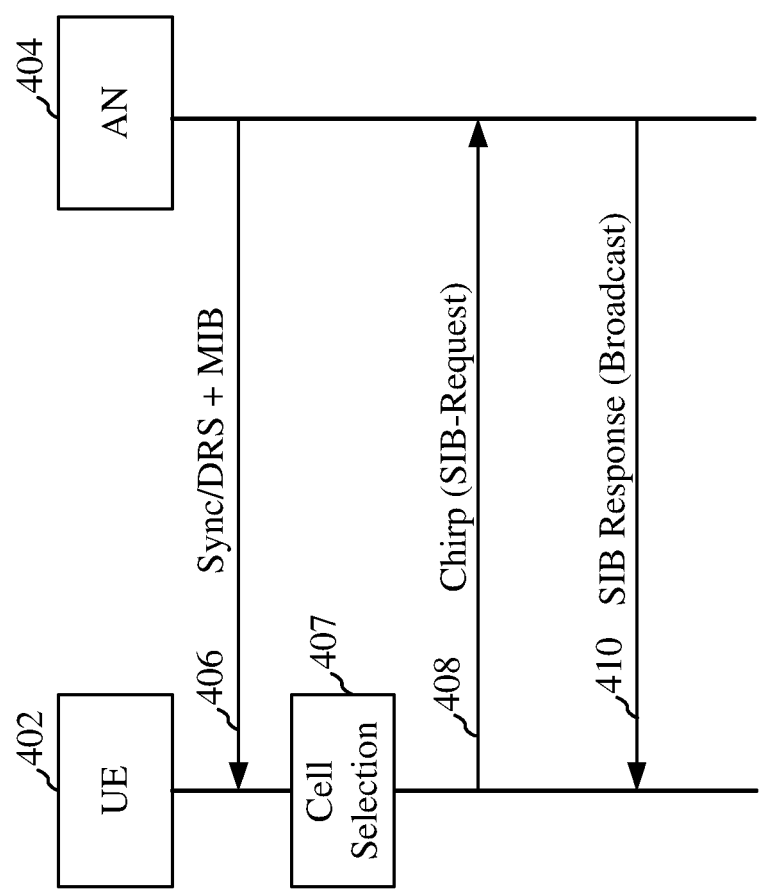
FIG. 4 illustrates a non-UE-centric call flow diagram between a UE and an access network in accordance with one aspect of the disclosure.

FIG. 4 illustrates a non-UE-centric call flow diagram between a UE 402 and an access network 404 in accordance with one aspect of the disclosure. Different from the UE-centric call flow diagrams of FIGS. 2 and 3, the UE 402 makes the cell selection in this non-UE-centric call flow example. Initially, the access network 404 transmits synchronization information and basic network configuration information 406 to the UE 402. The access network 404 and UE 402 may be the same as the access network and UE illustrated in FIG. 1. The synchronization information provides timing information that allows the UE 402 to achieve coarse frequency synchronization with the network 404. The basic network configuration information may be included in an MIB that may carry some physical layer information of the cell. With the basic network information (e.g., synchronization information and MIB), the UE 402 can receive additional information contained in one or more SIBs from the access network 404. The access network 404 may also broadcast a discovery reference signal (DRS) to the UE 402. The DRS may be included in the synchronization information 406 or a separate signal. DRS is a signal that allows the UE to identify the cell, eNB, or RH. In one example, the DRS may include a primary reference signal (PSS), a secondary reference signal (SSS), and/or a cell-specific reference signal.

Based on the synchronization information, DRS and MIB, the UE 402 may select a cell, eNB, or RH by performing a cell selection procedure 407. Any generally known cell selection procedure may be used. For example, the UE 402 may select the cell/RH with the best or strongest signal, which may be based on a signal-to-noise ratio (SNR), a signal-to-interference plus noise ratio (SINR), and/or a path-loss, for example. Then, the UE 402 may transmit a chirp signal 408 to the access network 404. For example, the chirp signal 408 may include a request (SIB-request) for one or more SIBs from the access network 404, and the chirp signal may be scrambled using the cell ID of the selected cell. The chirp signal 408 may be transmitted by the UE 402 periodically or at any predetermined time intervals. In one aspect of the disclosure, the chirp signal 408 may include an SIB-request bitmap that includes one or more bits (e.g., 20 bits). Each bit of the bitmap may correspond to one or more SIBs. For example, if a certain bit is set to a predetermined value (e.g., bit=1), the corresponding SIB(s) is requested from the access network 404.

In response to the chirp signal 408, the access network 404 transmits an SIB response 410 including the requested SIB(s) to the UE 402. In one example, the SIB response 410 may be scrambled with a cell ID of the selected cell and transmitted to a predetermined broadcast address. In some examples, the broadcast address may be a fixed value, a fixed UE ID, or a C-RNTI. If the UE 402 has selected a different serving cell, eNB, or RH, the UE may perform a handover (HO) procedure based on the requested SIBs to switch to the new serving cell/RH. In this example, the UE 402 can specifically identify the requested SIBs to the access network 404 because the UE selects the serving cell and transmits the SIB-request to the network.

Figure 5:
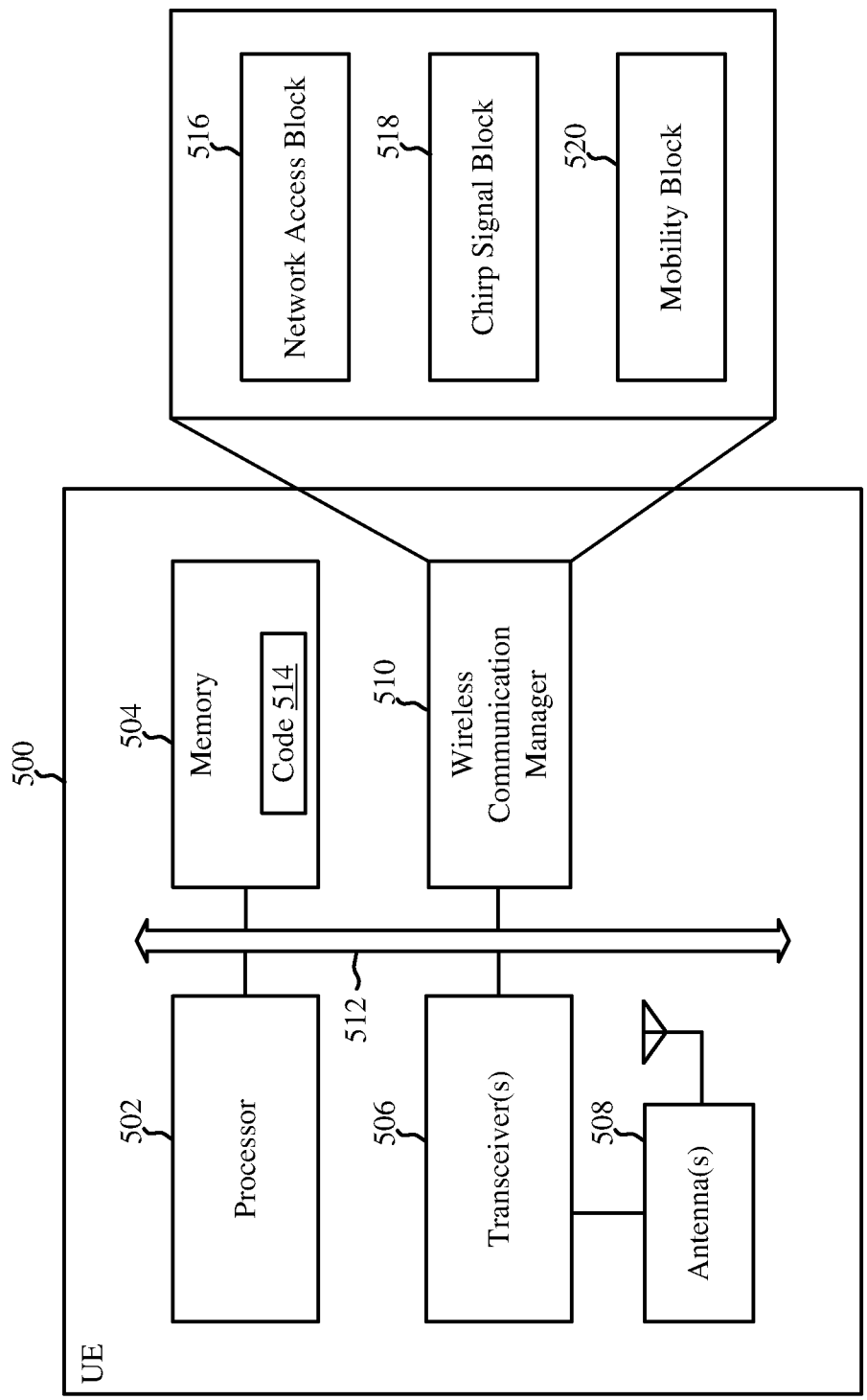
FIG. 5 shows a block diagram of a UE for use in wireless communication in accordance with various aspects of the present disclosure.

FIG. 5 shows a block diagram of a UE 500 for use in wireless communication, in accordance with various aspects of the present disclosure. The UE 500 may be the UEs illustrated in any of FIGS. 1-4. In some examples, the UE 500 may be included or be part of a personal computer (e.g., a laptop computer, a netbook computer, a tablet computer, etc.), a cellular telephone, a PDA, a DVR, an internet appliance, a gaming console, an e-reader, a vehicle, a home appliance, a lighting or alarm control system, an IoE device, etc. The UE 500 may, in some examples, have an internal power supply (not shown), such as a small battery, to facilitate mobile operation. The UE 500 may be configured to implement at least some of the UE or apparatus techniques and functions described with reference to FIGS. 1-4 and 9-12.

The UE 500 may include a processor 502, a memory 504, at least one transceiver (represented by transceiver(s) 506) or a communication interface, at least one antenna (represented by antenna(s) 508), and a wireless communication manager 510. Each of these components may be in communication with each other, directly or indirectly, over one or more buses 512. In some aspects of the disclosure, the wireless communication manager 510 may be implemented by or included in the processor 502

The memory 504 may include random access memory (RAM), read-only memory (ROM), and/or a non-transitory computer-readable medium. The memory 504 may store computer-readable, computer-executable code 514 containing instructions that are configured to, when executed, cause the processor 502 and/or wireless communication manager 510 to perform various functions described herein related to wireless communication, including, for example, at least some of the UE techniques and functions described with reference to FIGS. 1-4 and 9-12. Alternatively, the computer-executable code 514 may not be directly executable by the processor 502 but be configured to cause the UE 500 (e.g., when compiled and executed) to perform various of the functions described herein.

The processor 502 may include an intelligent or programmable hardware device, e.g., a central processing unit (CPU), a microcontroller, an ASIC, etc. The processor 502 may process information received through the transceiver(s) 506 or information to be sent to the transceiver(s) 506 for transmission through the antenna(s) 508. The processor 502 may handle, alone or in connection with the wireless communication manager 510, various aspects of communication over (or managing communications over) one or more radio frequency spectrum bands.

The transceiver(s) 506 may include a modem configured to modulate packets and provide the modulated packets to the antenna(s) 508 for transmission, and to demodulate packets received from the antenna(s) 508. The transceiver(s) 506 may, in some examples, be implemented as one or more transmitters and one or more separate receivers. The transceiver(s) 506 may support communications in one or more radio frequency spectrum bands and/or radio access technology. The transceiver(s) 506 may be configured to communicate bi-directionally, via the antenna(s) 508, with one or more of the network access devices (e.g., one or more of the radio heads) described with reference to FIG. 1-4 or other wireless devices (e.g., peer-to-peer (P2P) devices). While the UE 500 may include a single antenna, there may be examples in which the UE 500 may include multiple antennas for diversity and/or MIMO operations.

The wireless communication manager 510 may be configured to perform or control some or all of the UE or apparatus techniques or functions described with reference to FIGS. 1-4 and 9-12 related to wireless communication over one or more radio frequency spectrum bands. The wireless communication manager 510, or portions of it, may include a processor, or some or all of the functions of the wireless communication manager 510 may be performed by the processor 502 or in connection with the processor 502. In some examples, the wireless communication manager 510 may be included in the processor 502.

In some aspects of the disclosure, the wireless communication manager 510 may include one or more of a network access block 516, a chirp signal block 518, and a mobility block 520. The network access block 516 may be configured to receive and/or process synchronization information and/or basic network configuration information of an access network. The synchronization information provides timing information that allows the UE to achieve coarse frequency synchronization with the access network. With the basic network information (e.g., MIB), the UE (e.g., the processor 502 and/or network access block 516) can determine and receive additional network information contained in one or more SIB s from the access network. The chirp signal block 518 may be configured to generate and transmit (via the transceiver 506 and antenna 508) a chirp signal to the access network. In some examples, the chirp signal may include one or more of a pilot signal, a reference signal, a UE ID, and/or a buffer status report (BSR). The chirp signal (or access signal) is configured to facilitate the access network in determining a system information response (one or more SIBs) based on the chirp signal. The mobility block 520 may be configured to select a serving cell based on the synchronization information and/or basic network configuration information of the access network. In some aspects of the disclosure, the serving cell may be selected by the access network (e.g., an UE-centric network).

Figure 6:
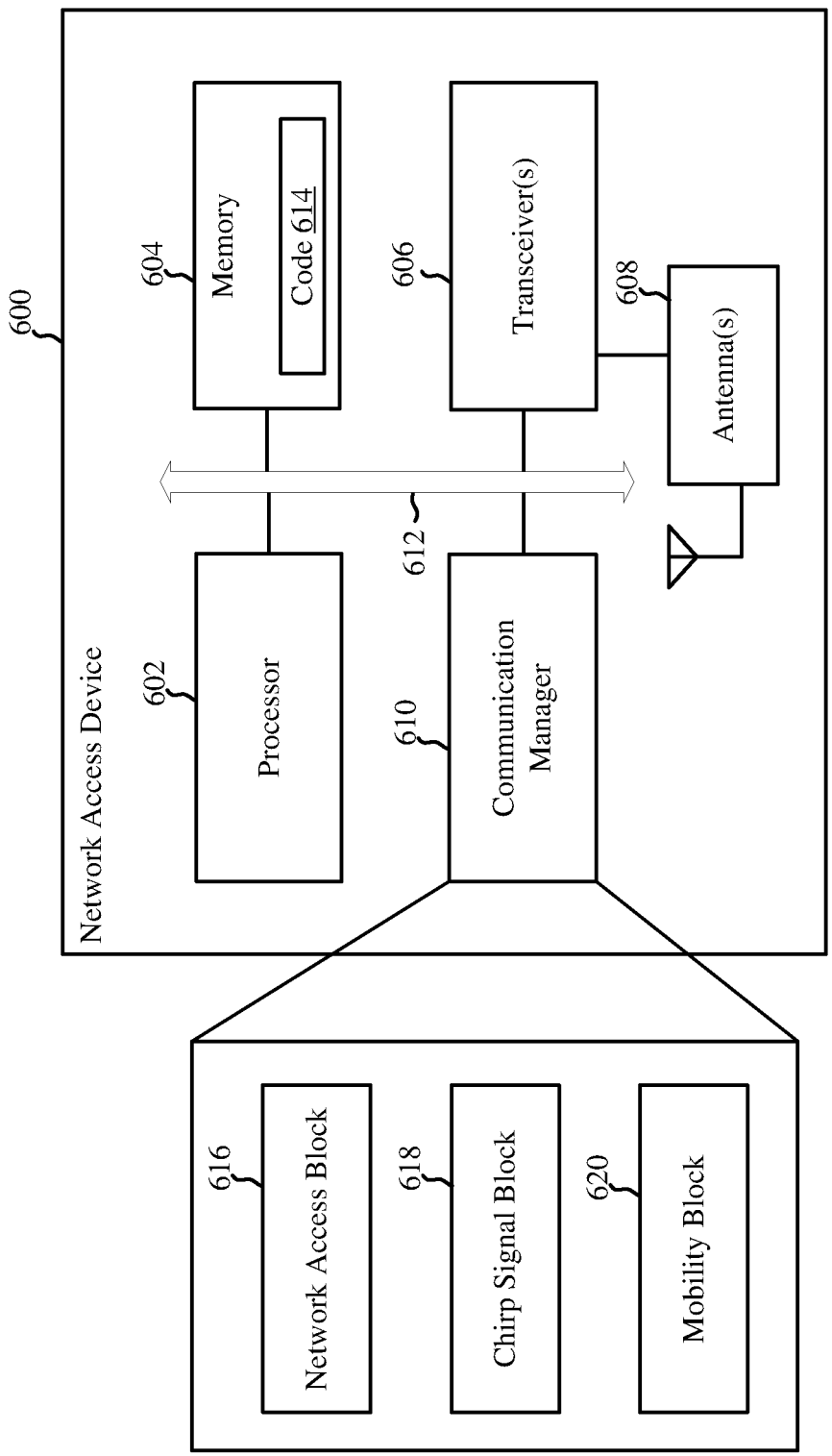
FIG. 6 shows a block diagram of a network access device for use in wireless communication in accordance with various aspects of the present disclosure.

FIG. 6 shows a block diagram of a network access device 600 for use in wireless communication, in accordance with various aspects of the present disclosure. In some examples, the network access device 600 may be a radio head (RH) or an eNB as described with reference to FIG. 1. The network access device 600 may be configured to implement at least some of the network access device, radio head, or apparatus techniques and functions described with reference to FIGS. 1-4 and 9-12.

The network access device 600 may include a processor 602, a memory 604, at least one transceiver or communication interface (represented by transceiver(s) 606), at least one antenna (represented by antenna(s) 608), and a communication manager 610. Each of these components may be in communication with each other, directly or indirectly, over one or more buses 612. In some aspects of the disclosure, the communication manager 610 may be implemented by or included in the processor 602.

The memory 604 may include RAM, ROM, or a non-transitory computer-readable medium. The memory 604 may store computer-readable, computer-executable code 614 containing instructions that are configured to, when executed, cause the processor 602 to perform various functions described herein related to wireless communication, including, for example, at least some of the network access device, radio head, or apparatus techniques and functions described with reference to FIGS. 1-4 and 8-12. Alternatively, the computer-executable code 614 may not be directly executable by the processor 602 but be configured to cause the network access device 600 (e.g., when compiled and executed) to perform various of the functions described herein.

The processor 602 may include an intelligent or programmable hardware device, e.g., a CPU, a microcontroller, an ASIC, etc. The processor 602 may process information received through the transceiver(s) 606 or information to be sent to the transceiver(s) 606 for transmission through the antenna(s) 608. The processor 602 may handle, alone or in connection with the communication manager 610, various aspects of communicating over (or managing communications over) one or more radio frequency spectrum bands and/or radio access technology.

The transceiver(s) 606 may include a modem configured to modulate packets and provide the modulated packets to the antenna(s) 608 for transmission, and to demodulate packets received from the antenna(s) 608. The transceiver(s) 606 may, in some examples, be implemented as one or more transmitters and one or more separate receivers. The transceiver(s) 606 may support communications in one or more radio frequency spectrum bands and/or radio access technology. The transceiver(s) 606 may be configured to communicate bi-directionally, via the antenna(s) 608, with one or more of the UEs described with reference to FIGS. 1-5. While the network access device 600 may include a single antenna, there may be examples in which the network access device 600 may include multiple antennas 608 for diversity and/or MIMO operations.

The communication manager 610 may be configured to perform or control some or all of the network access device, radio head, eNB, or apparatus techniques or functions described with reference to FIGS. 1-4 and 8-12 related to wireless communication over one or more radio frequency spectrum bands and/or radio access technology. The communication manager 610 may also be used to manage communications with an ANC associated with the network access device 600. The communications with the ANC may be over wired or wireless communication links, for example, depending on the implementation. The communication manager 610, or portions of it, may include a processor, or some or all of the functions of the communication manager 610 may be performed by the processor 602 or in connection with the communication manager 610. In some examples, the communication manager 610 may be included in the processor 602.

In some aspects of the disclosure, the wireless communication manager 610 may include one or more of a network access block 616, a chirp signal block 618, and a mobility block 620. The network access block 616 may be configured to transmit to and/or provide an UE with the synchronization information and/or basic network configuration information of an access network. The synchronization information provides timing information that allows the UE to achieve coarse frequency synchronization with the access network. The network access block 616 may further be configured to transmit additional network information contained in one or more SIBs. The chirp signal block 618 may be configured to receive (via the transceiver 506 and antenna 508), monitor, and/or decode a chirp signal (or an access signal) from an UE. In some examples, the chirp signal may include one or more of a pilot signal, a reference signal, an UE ID, and/or a buffer status report (BSR). The chirp signal is configured to facilitate or assist the access network in determining a system information response (one or more SIB s) based on the chirp signal. The mobility block 620 may be configured to select a serving cell for a UE in an UE-centric network.

Figure 7:
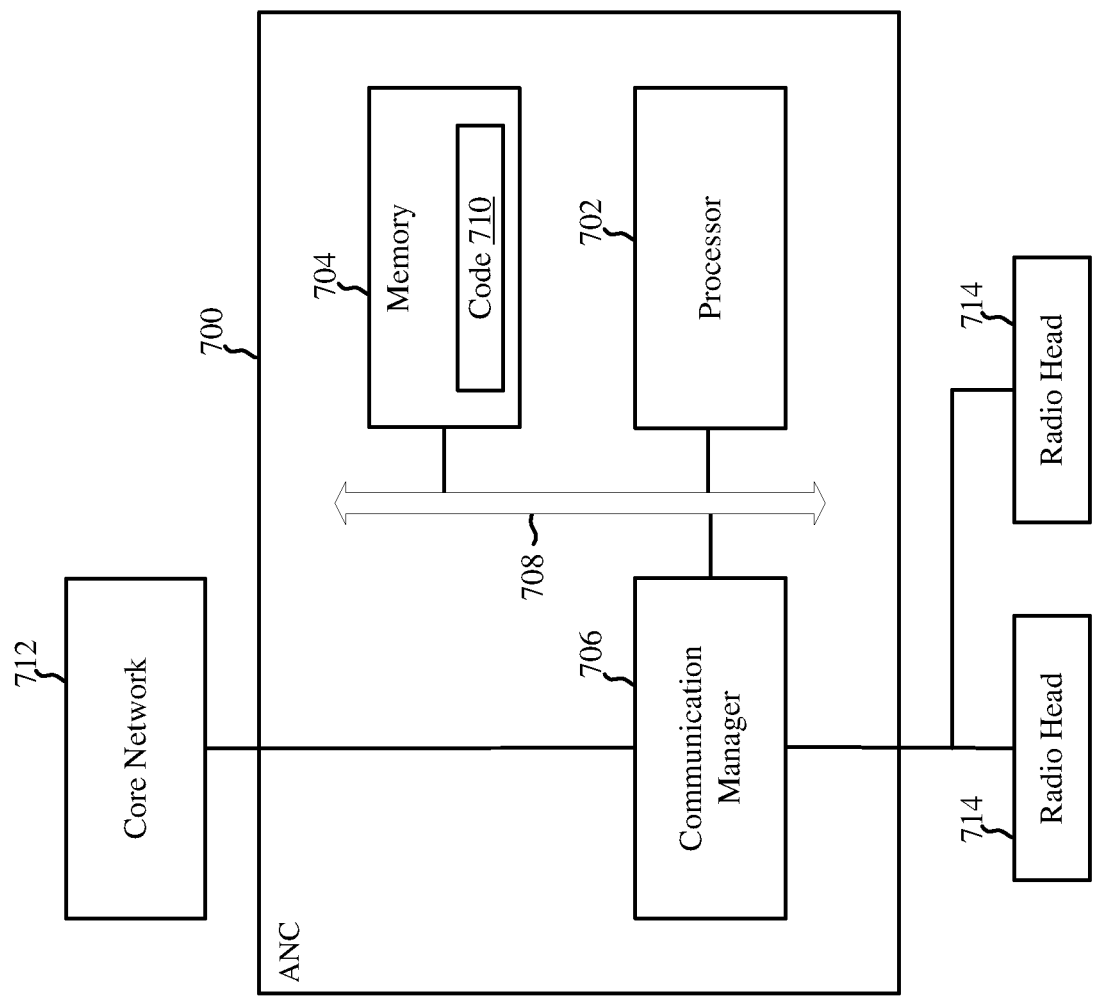
FIG. 7 shows a block diagram of an access network controller (ANC) for use in wireless communication in accordance with various aspects of the present disclosure.

FIG. 7 shows a block diagram of an access network controller (ANC) 700 for use in wireless communication, in accordance with various aspects of the present disclosure. In some examples, the ANC 700 may be an example of the ANCs described with reference to FIG. 1. The ANC 700 may be configured to implement or facilitate at least some of the techniques and functions described with reference to FIGS. 1-4 and 8-12.

The ANC 700 may include a processor 702, a memory 704, and a communication manager 706. Each of these components may be in communication with each other, directly or indirectly, over one or more buses 708. The memory 704 may include RAM, ROM, and/or a non-transitory computer-readable medium. The memory 704 may store computer-readable, computer-executable code 710 containing instructions that are configured to, when executed, cause the processor 702 to perform various functions described herein related to wireless communication, including, for example, the techniques and functions described with reference to FIGS. 1-4 and 8-12. Alternatively, the computer-executable code 710 may not be directly executable by the processor 702 but be configured to cause the ANC 700 (e.g., when compiled and executed) to perform various of the functions described herein.

The processor 702 may include an intelligent or programmable hardware device, e.g., a CPU, a microcontroller, an ASIC, etc. The processor 702 may process information received through the communication manager 706 from a core network 712, or from one or more other network access devices 600 (e.g., from one or more radio heads or from one or more other ANCs). The processor 702 may also process information to be sent to the communication manager 706, for transmission to the core network 712 or to one or more other network access devices 714 (e.g., to one or more radio heads or to one or more other ANCs). The processor 702 may handle, alone or in connection with the communication manager 706, various aspects of communicating over (or managing communications over) one or more radio frequency spectrum bands.

The communication manager 706 may be configured to perform or control some or all of the techniques or functions described with reference to FIGS. 1-4 and 8-12 related to wireless communication over one or more radio frequency spectrum bands and/or radio access technology. The communication manager 706 may also be used to manage communications with a core network, one or more radio heads, or one or more other ANCs, for example as shown in FIGS. 1, 5, and 6. The communications with the network, radio heads, or other ANCs may be over wired or wireless communication links, for example, depending on the implementation. The communication manager 706, or portions of it, may include a processor, or some or all of the functions of the communication manager 706 may be performed by the processor 702. In some examples, the communication manager 706 may be included in the processor 702.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Figure 8:
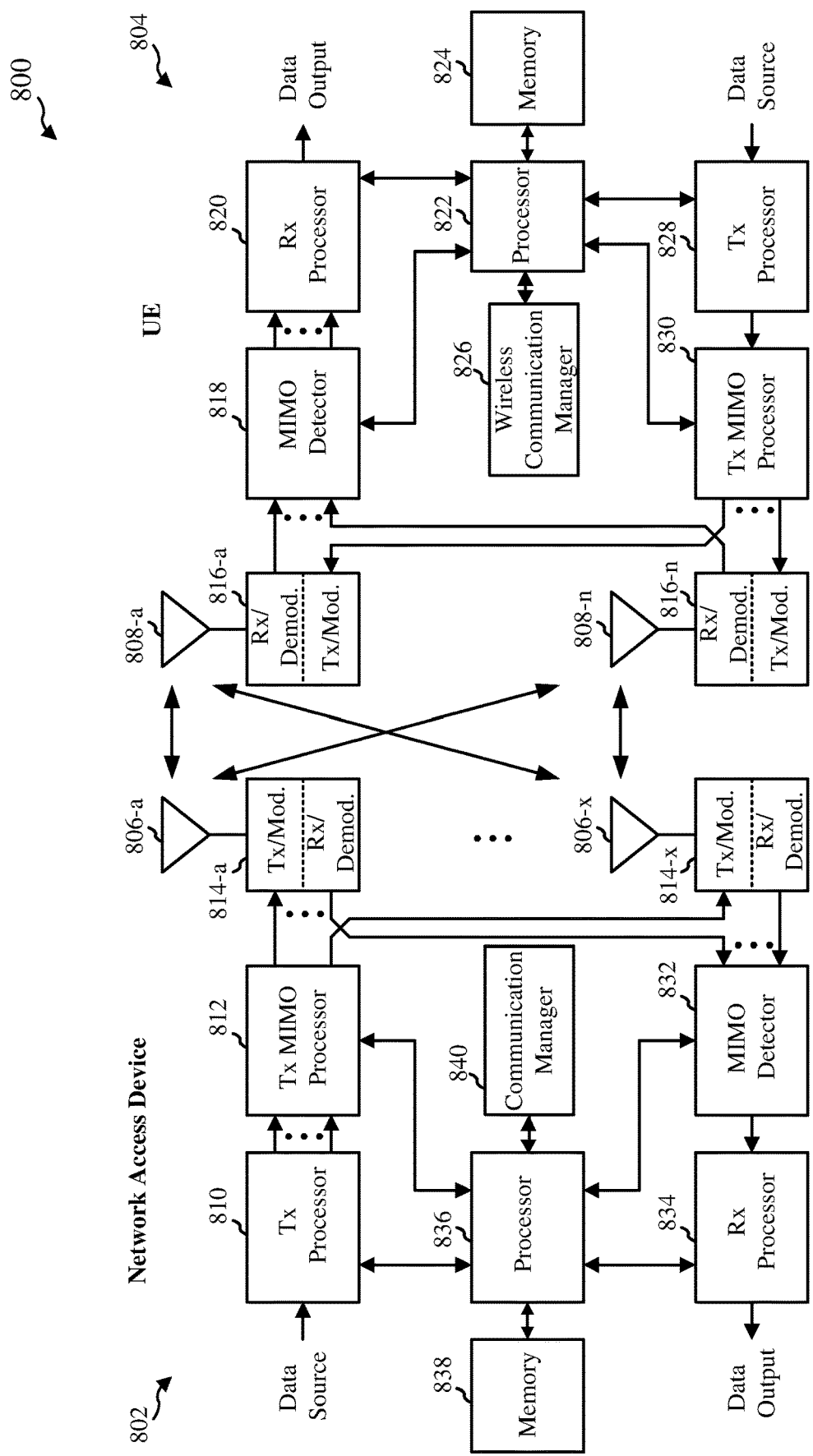
FIG. 8 is a block diagram of a multi-input and multi-output (MIMO) communication system in accordance with various aspects of the present disclosure.

In some examples, the wireless communication system 100 may utilize MIMO communication techniques. FIG. 8 is a block diagram of a MIMO communication system 800 in accordance with various aspects of the present disclosure. The MIMO communication system 800 may include a network access device 802 and an UE 804. The MIMO communication system 800 may illustrate aspects of the wireless communication system 100 shown in FIG. 1. In some examples, the network access device 802 may be an example of one or more aspects of a network access device 600 (e.g., an eNB, an ANC, a radio head, or a base station), such as one of the network access devices described with reference to FIGS. 1-4 and 6. The network access device 802 may be equipped with antennas 806-$a$ through 806-$x$, and the UE 804 may be equipped with antennas 808-$a$ through 808-$n$. In the MIMO communication system 800, the network access device 802 may be able to send data over multiple communication links or spatial streams at the same time. Each communication link may be called a "layer," and the "rank" of the communication link may indicate the number of layers used for communication. For example, in a 2×2 MIMO communications system where network access device 802 transmits two "layers," the rank of the communication link between the network access device 802 and the UE 804 is two.

At the network access device 802, a transmit processor 810 may receive data from a data source. The transmit processor 810 may process the data. The transmit processor 810 may also generate control symbols and/or reference symbols. A transmit (Tx) MIMO processor 812 may perform spatial processing (e.g., precoding) on data symbols, control symbols, and/or reference symbols, if applicable, and may provide output symbol streams to the transmit modulator/demodulators 814-$a$ through 814-$x$. Each modulator/demodulator 814 may process a respective output symbol stream (e.g., for OFDM, etc.) to obtain an output sample stream. Each modulator/demodulator 814 may further process (e.g., convert to analog, amplify, filter, and upconvert) the output sample stream to obtain a DL signal. In one example, DL signals from modulator/demodulators 814-$a$ through 814-$x$ may be transmitted via the antennas 806-$a$ through 806-$x$, respectively.

At the UE 804, the antennas 808-$a$ through 808-$n$ may receive the DL signals from the network access device 802 and may provide the received signals to the modulator/demodulators 816-$a$ through 816-$n$, respectively. Each modulator/demodulator 816 may condition (e.g., filter, amplify, downconvert, and digitize) a respective received signal to obtain input samples. Each modulator/demodulator 816 may further process the input samples (e.g., for OFDM, etc.) to obtain received symbols. A MIMO detector 818 may obtain received symbols from all the modulator/demodulators 816-$a$ through 816-$n$, perform MIMO detection on the received symbols, if applicable, and provide detected symbols. A receive processor 820 may process (e.g., demodulate, deinterleave, and decode) the detected symbols, providing decoded data for the UE 804 to a data output, and provide decoded control information to a processor 822, or memory 824.

The processor 822 may in some cases execute stored instructions to instantiate a wireless communication manager 826. In some examples, the wireless communication manager 826 may include components of, or may be used to perform functions of, the wireless communication manager 510 described with reference to FIG. 5.

On the uplink (UL), at the UE 804, a transmit processor 828 may receive and process data from a data source. The transmit processor 828 may also generate reference symbols for a reference signal. The symbols from the transmit processor 828 may be precoded by a transmit MIMO processor 830 if applicable, further processed by the modulator/demodulators 816-$a$ through 816-$n$ (e.g., for SC-FDMA, etc.), and be transmitted to the network access device 802 in accordance with the transmission parameters received from the network access device 802. At the network access device 802, the UL signals from the UE 804 may be received by the antennas 806, processed by the modulator/demodulators 814, detected by a MIMO detector 832 if applicable, and further processed by a receive processor 834. The receive processor 834 may provide decoded data to a data output and to the processor 836 and/or memory 838. The processor 836 may in some cases execute stored instructions to instantiate a communication manager 840. In some examples, the communication manager 840 may include components of, or may be used to perform functions of, the communication manager 610 or 706 described with reference to FIG. 6 or 7.

The components of the UE 804 may, individually or collectively, be implemented with one or more ASICs adapted to perform some or all of the applicable functions in hardware. Each of the noted modules may be a means for performing one or more functions related to the operation of the MIMO communication system 800. Similarly, the components of the network access device 802 may, individually or collectively, be implemented with one or more ASICs adapted to perform some or all of the applicable functions in hardware. Each of the noted components may be a means for performing one or more functions related to the operation of the MIMO communication system 800.

Figure 9:
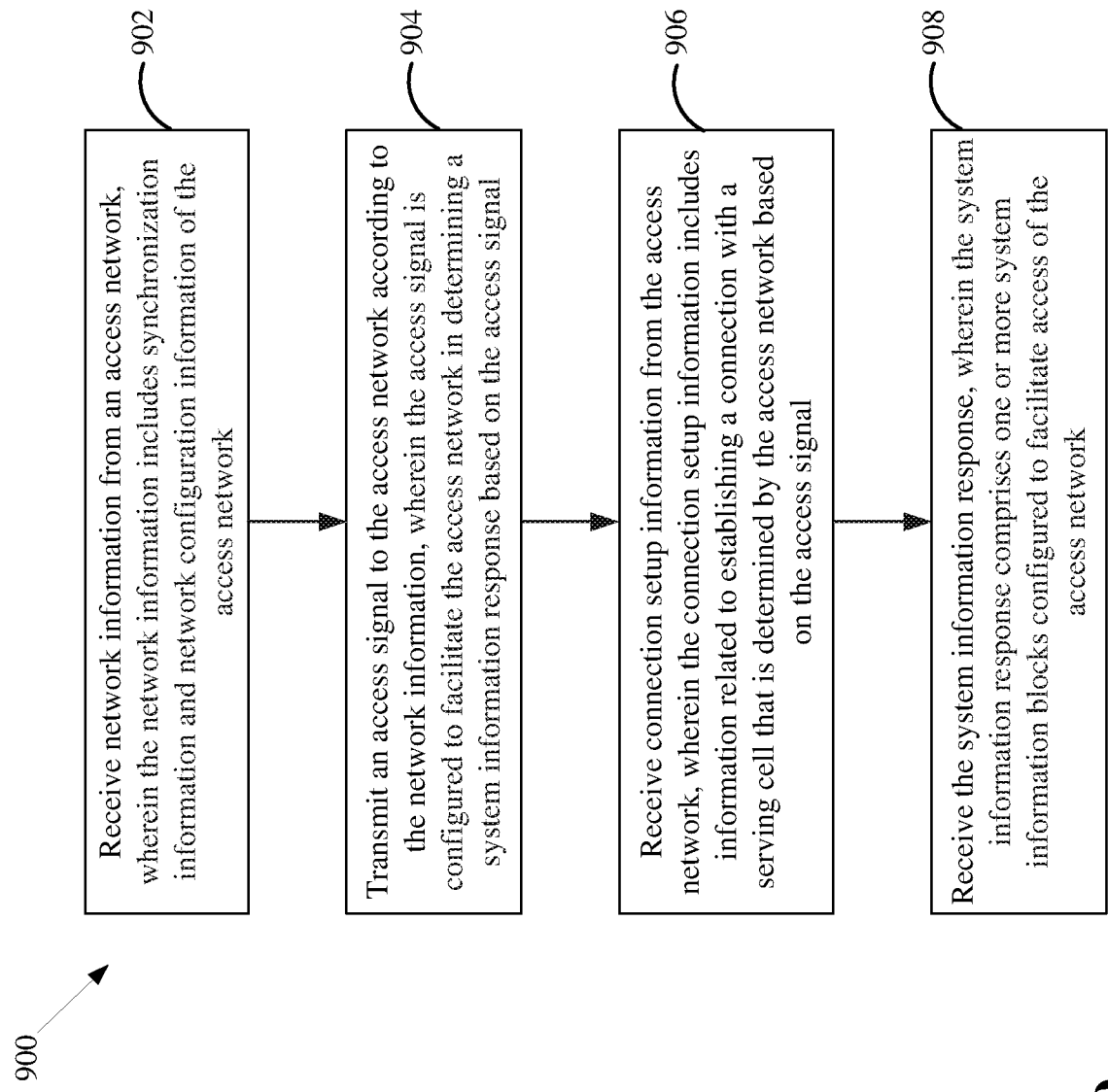
FIG. 9 is a flow chart illustrating an example of a method for wireless communication at a UE-centric wireless network in accordance with various aspects of the present disclosure.

FIG. 9 is a flow chart illustrating an example of a method 900 for wireless communication operable at an UE in an UE-centric access network, in accordance with various aspects of the present disclosure. In some examples, the method 900 may be performed by an UE illustrated in FIGS. 1-3, and/or 5. At block 902, the UE may receive network information from an access network. For example, the network information includes synchronization information and basic network configuration information of the access network. For example, the network information may include the synchronization information and basic network configuration information 206 of FIG. 2 or synchronization information (Sync) and basic network configuration information 306 of FIG. 3. At block 904, the UE may transmit an access signal to the access network according to the network information. For example, the access signal may include a chirp signal (e.g., chirp signal 208 or chirp signal 308 as illustrated in FIG. 2 or 3). The access signal may be configured to facilitate the access network in determining a system information response based on the access signal. The system information response may include one or more SIBs and/or other network information needed for accessing the network.

At block 906, the UE may receive connection setup information from the access network. The connection setup information includes information related to establishing a connection with a serving cell that is determined by the access network based on the access signal. For example, the connection setup information may be the connection setup information 212 or connection setup information 312 as illustrated in FIG. 2 or 3. At block 908, the UE may receive a system information response from the access network. For example, the system information response may include one or more SIBs illustrated in FIG. 2 or 3. The SIBs provides the UE with the network information and/or configuration to facilitate access to the access network.

Figure 10:
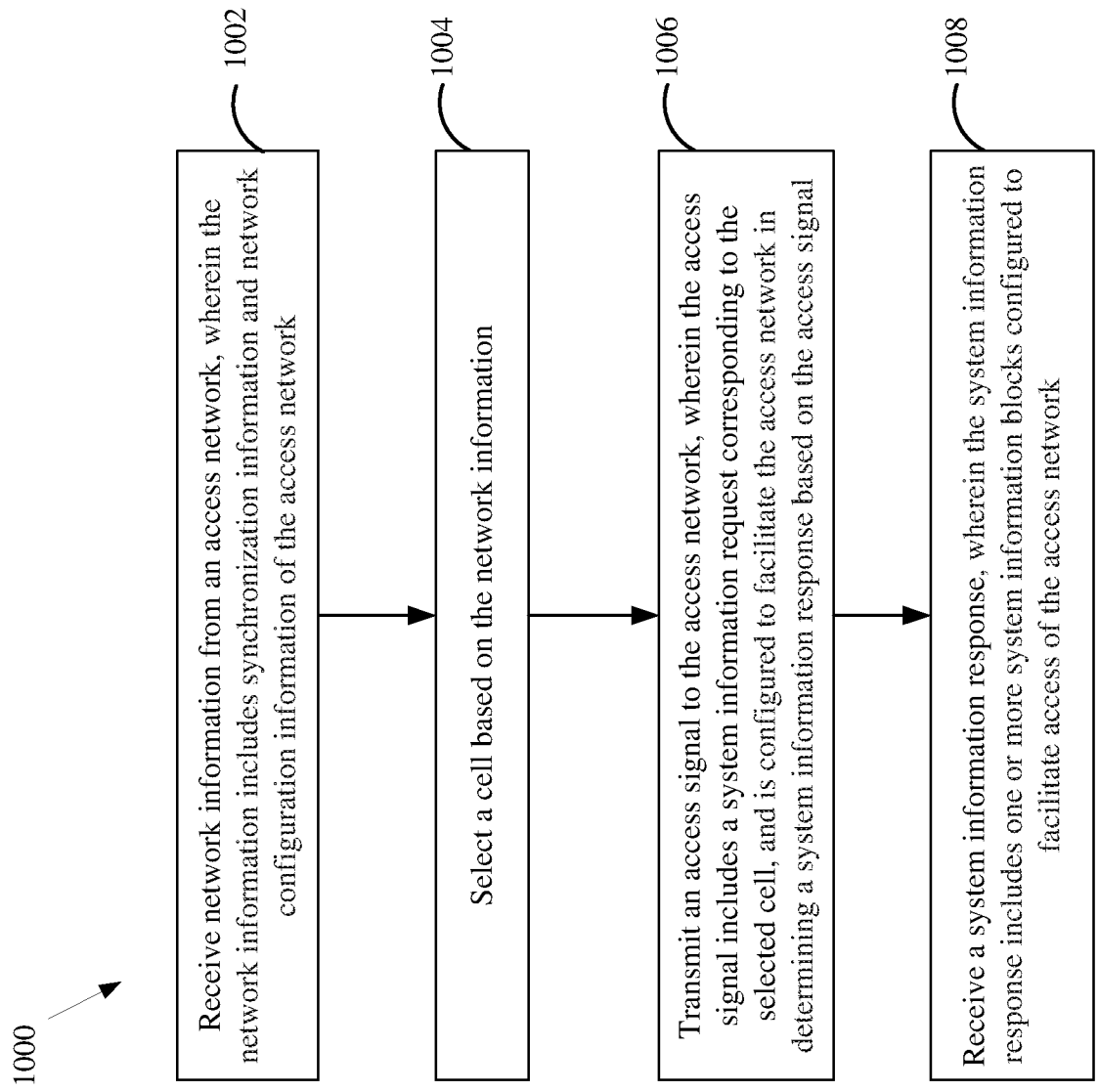
FIG. 10 is a flow chart illustrating an example of a method for wireless communication at a non-UE-centric wireless network in accordance with various aspects of the present disclosure.

FIG. 10 is a flow chart illustrating an example of a method 1000 for wireless communication operable at an UE in a non-UE centric access network, in accordance with various aspects of the present disclosure. In some examples, the method 1000 may be performed by an UE illustrated in FIGS. 1, 4, and/or 5. At block 1002, the UE may receive network information from an access network. The network information may include synchronization information and basic network configuration information of the access network. For example, the network information may include the sync/DRS signal 406 illustrated in FIG. 4. At block 1004, the UE may select a cell based on the network information (e.g., DRS). For example, the UE may be in a non-UE centric access network, and performs a cell selection procedure based on the reference signal.

At block 1006, the UE may transmit an access signal to the access network. The access signal may include a system information request corresponding to the selected cell and is configured to facilitate the access network in determining a system information response based on the access signal. For example, the access signal may be a chirp signal 408 illustrated in FIG. 4. At block 1008, the UE may receive a system information response that may include one or more system information blocks (SIBs) configured to facilitate access of the access network. For example, the system information response may be the SIB response 410 illustrated in FIG. 4.

Figure 11:
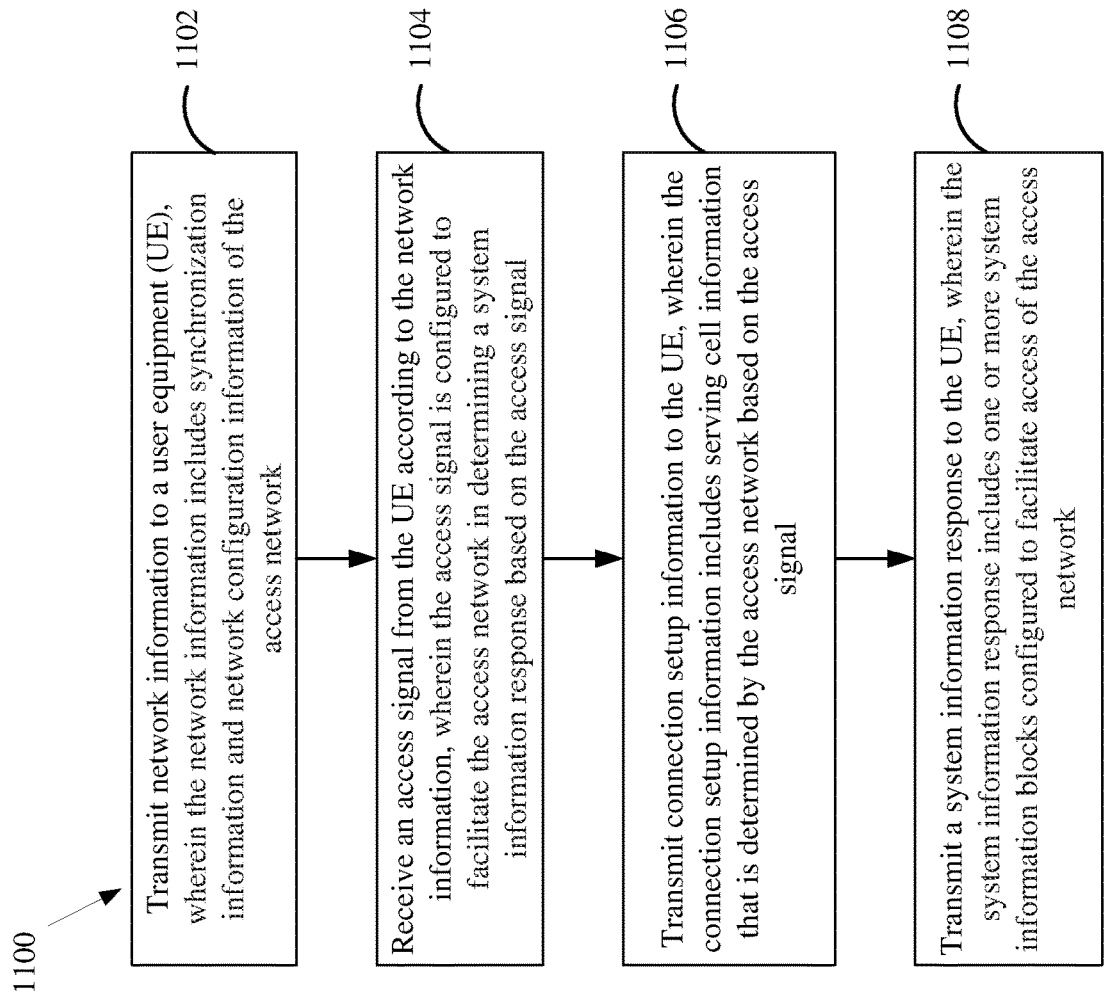
FIG. 11 is a flow chart illustrating an example of a method for UE-centric wireless communication at an access network in accordance with various aspects of the present disclosure.

FIG. 11 is a flow chart illustrating an example of a method 1100 for wireless communication operable at an UE-centric access network in accordance with various aspects of the present disclosure. In some examples, the method 1100 may be performed by an access network (AN) or network access device illustrated in FIGS. 1-3. The access network may include one or more radio heads (SHRs or HRs) and/or ANCs illustrated in FIGS. 1, 6, and 7. At block 1102, the access network may transmit network information to a UE. The network information may include synchronization information and basic network configuration information of the access network. For example, the network information may include the synchronization information 206 or 306 illustrated in FIG. 2 or 3. At block 1104, the access network may receive an access signal from the UE according to the network information. The access signal may be configured to facilitate the access network in determining a system information response based on the access signal. For example, the access signal may be the chirp signal 208 or 308 illustrated in FIG. 2 or 3. Based on the access signal, the access network may select a serving cell for the UE.

At block 1106, the access network may transmit connection setup information to the UE. The connection setup information includes serving cell information that is determined by the access network based on the access signal. For example, the connection setup information may be the connection setup information 212 or 312 illustrated in FIG. 2 or 3. At block 1108, the access network may transmit a system information response to the UE. The system information response may include one or more system information blocks (SIB s) configured to facilitate access of the access network. For example, the system information response may include the SIB response 214 or 314 illustrated in FIGS. 2 and/or 3.

Figure 12:
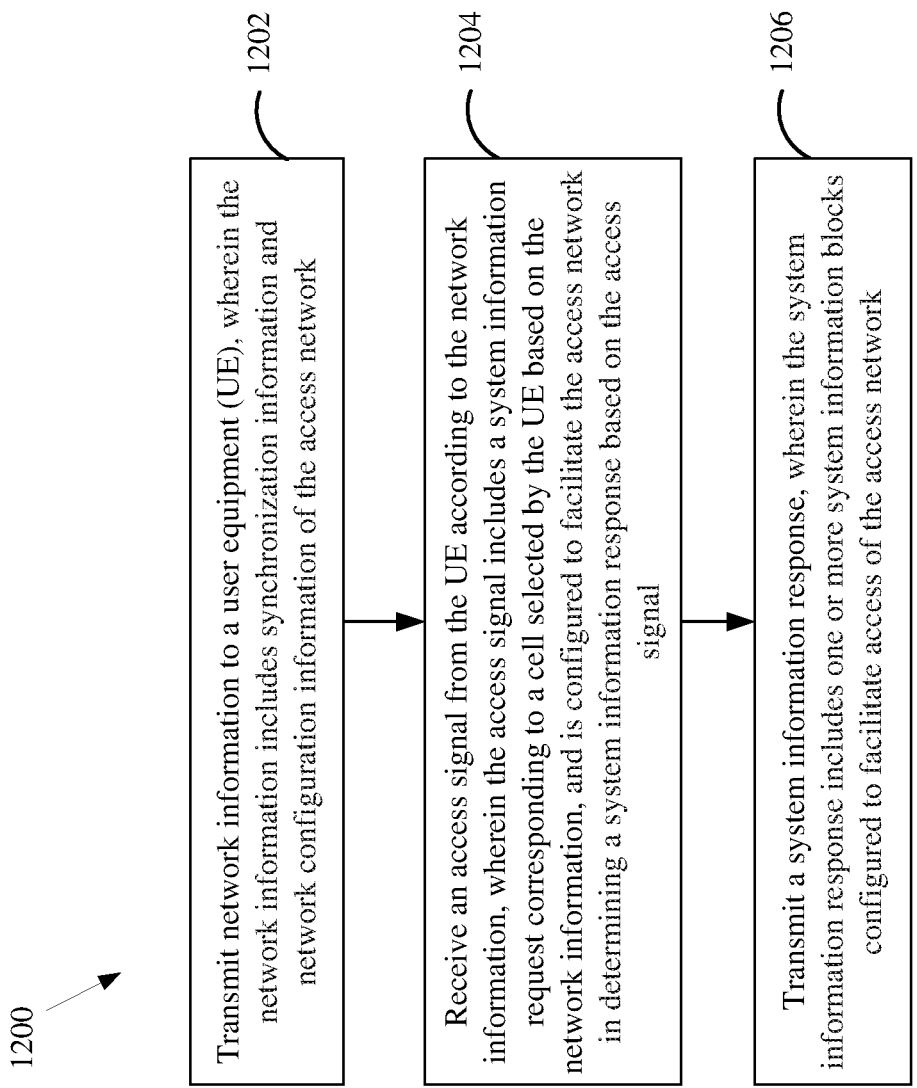
FIG. 12 is a flow chart illustrating an example of a method for non-UE-centric wireless communication at an access network in accordance with various aspects of the present disclosure.

FIG. 12 is a flow chart illustrating an example of a method 1200 for wireless communication operable at a non-UE centric access network in accordance with various aspects of the present disclosure. In some examples, the method 1200 may be performed by an access network (AN), eNB, or RH illustrated in FIGS. 1 and 4. At block 1202, the access network may transmit network information to a UE. The network information may include synchronization information and basic network configuration information of the access network. For example, the network information may include the sync/DRS signal 406 illustrated in FIG. 4. Based on the network information, the UE may select a serving cell. At block 1204, the access network may receive an access signal from the UE according to the network information. For example, the access signal may be the chirp signal 408 illustrated in FIG. 4. The access signal may include a system information request corresponding to a cell selected by the UE based on the network information, and may be configured to facilitate the access network in determining a system information response based on the access signal. At block 1206, the access network may transmit a system information response that includes one or more system information blocks (SIB s) configured to facilitate access of the access network. For example, the system information response may include the SIB response 410 illustrated in FIG. 4.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication operable at a user equipment (UE), comprising:
   receiving a master information block (MIB) from an access network, the MIB comprising configuration information for a first cell of the access network;
   receiving a discovery reference signal from the access network, the discovery reference signal comprising at least one of a primary reference signal, a secondary reference signal, a cell-specific reference signal, or a combination thereof;
   selecting the first cell of the access network utilizing information in the MIB and information contained in the discovery reference signal;
   transmitting a chirp signal to the access network as part of a random access procedure to establish a connection with the first cell, the chirp signal comprising at least one of a reference signal, a pilot signal, a UE identifier, a buffer status report, or a combination thereof, the chirp signal being configured as a system information request that specifies at least one system information block requested by the UE; and
   receiving, in a unicast radio resource control (RRC) message, a system information response transmitted in response to the chirp signal, wherein the system information response comprises one or more of the at least one system information block requested by the UE scrambled with a serving cell identifier.

2. The method of claim 1, wherein the chirp signal is scrambled using a cell identifier of the first cell.

3. The method of claim 1, wherein the chirp signal comprises a system information block request bitmap.

4. The method of claim 1, wherein the chirp signal comprises a reference signal.

5. A method of wireless communication operable at an access network comprising a plurality of base stations, the method comprising:
   transmitting a master information block (MIB) comprising configuration information for a first cell of the access network;
   transmitting a discovery reference signal, the discovery reference signal comprising at least one of a primary reference signal, a secondary reference signal, a cell-specific reference signal, or a combination thereof;
   receiving a chirp signal from a user equipment (UE) as part of a random access procedure to establish a connection between the UE and the first cell, the chirp signal comprising at least one of a reference signal, a pilot signal, a UE identifier, a buffer status report, or a combination thereof, the chirp signal being configured as a system information request that specifies at least one system information block requested by the UE;
   selecting one or more of the at least one system information block requested by the UE; and
   transmitting, in a unicast radio resource control (RRC) message, a system information response to the UE in response to the chirp signal, wherein the system information response comprises the one or more of the at least one system information block requested by the UE scrambled with a serving cell identifier.

6. The method of claim 5, wherein the chirp signal is scrambled using a cell identifier of the first cell.

7. The method of claim 5, wherein the chirp signal comprises a system information block request bitmap.

8. The method of claim 5, wherein the chirp signal comprises a reference signal.

9. A user equipment (UE), comprising:
   a communication interface configured to communicate with an access network;
   a memory; and
   one or more processors operatively coupled to the communication interface and the memory, the one or more processors and the memory configured to:
     receive a master information block (MIB) from an access network, the MIB comprising configuration information for a first cell of the access network;
     receive a discovery reference signal from the access network, the discovery reference signal comprising at least one of a primary reference signal, a secondary reference signal, a cell-specific reference signal, or a combination thereof;
     select the first cell of the access network utilizing information in the MIB and information contained in the discovery reference signal;
     transmit a chirp signal to the access network as part of a random access procedure to establish a connection with the first cell, the chirp signal comprising at least one of a reference signal, a pilot signal, a UE identifier, a buffer status report, or a combination thereof, the chirp signal being configured as a system information request that specifies at least one system information block requested by the UE; and
     receive, in a unicast radio resource control (RRC) message, a system information response transmitted in response to the chirp signal, wherein the system information response comprises one or more of the at least one system information block requested by the UE scrambled with a serving cell identifier.

10. The user equipment of claim 9, wherein the chirp signal is scrambled using a cell identifier of the first cell.

11. The user equipment of claim 9, wherein the chirp signal comprises a system information block request bitmap.

12. The user equipment of claim 9, wherein the chirp signal comprises a reference signal.

13. An access network node comprising:
   a communication interface configured to communicate with a user equipment (UE);
   a memory comprising executable code; and
   one or more processors operatively coupled to the communication interface and the memory, the one or more processors and the memory configured to:
     transmit a master information block (MIB) comprising configuration information for a first cell of the access network;
     transmit a discovery reference signal, the discovery reference signal comprising at least one of a primary reference signal, a secondary reference signal, a cell-specific reference signal, or a combination thereof;
     receive a chirp signal from a user equipment (UE) as part of a random access procedure to establish a connection between the UE and the first cell, the chirp signal comprising at least one of a reference signal, a pilot signal, a UE identifier, a buffer status report, or a combination thereof, the chirp signal being configured as a system information request that specifies at least one system information block requested by the UE;

select one or more of the at least one system information block requested by the UE; and transmit, in a unicast radio resource control (RRC) message, a system information response to the UE in response to the chirp signal, wherein the system information response comprises the one or more of the at least one system information block requested by the UE scrambled with a serving cell identifier.

14. The access network node of claim 13, wherein the chirp signal is scrambled using a cell identifier of the first cell.

15. The access network node of claim 13, wherein the chirp signal comprises a system information block request bitmap.

16. The access network node of claim 13, wherein the chirp signal comprises a reference signal.

* * * * *